United States Patent
Hay

[11] 3,736,039
[45] May 29, 1973

[54] SYNTHETIC 3-D HOLOGRAM WITH REDUCED DISPERSION UPON RECONSTRUCTION

[75] Inventor: Donald John Hay, Basingstoke, England

[73] Assignee: United Kingdom Atomic Energy Authority, London, England

[22] Filed: May 17, 1971

[21] Appl. No.: 143,944

[30] Foreign Application Priority Data
May 21, 1970 Great Britain...................24,773/70

[52] U.S. Cl..........................350/3.5, 355/2
[51] Int. Cl.............................G02b 27/22
[58] Field of Search..........350/3.5; 340/173 LT; 355/2

[56] References Cited
UNITED STATES PATENTS 3,608,993  9/1971  De Bitetto...................350/3.5
3,560,071  2/1971  Silverman et al.............350/3.5
3,598,484  10/1971 Redman et al...............350/3.5

*Primary Examiner*—Ronald L. Wibert
*Assistant Examiner*—Ronald J. Stern
*Attorney*—Larson, Taylor & Hinds

[57] ABSTRACT

The system of producing 3-D holographic reconstructions from a plurality of photographs of a scene taken from different angles (as described in British Pat. specification No. 1,218,556 and U.S. Pat. No. 3,598,484) is modified by using an oblique reference beam of specified direction when making the successive holograms therefrom on a common photo-sensitive sheet. The reference beam is directed in a plane which is normal to the sheet and which includes its axis of rotation. This direction allows the system to be mechanical simpler and also reduces the optical dispersion when viewing.

7 Claims, 1 Drawing Figure

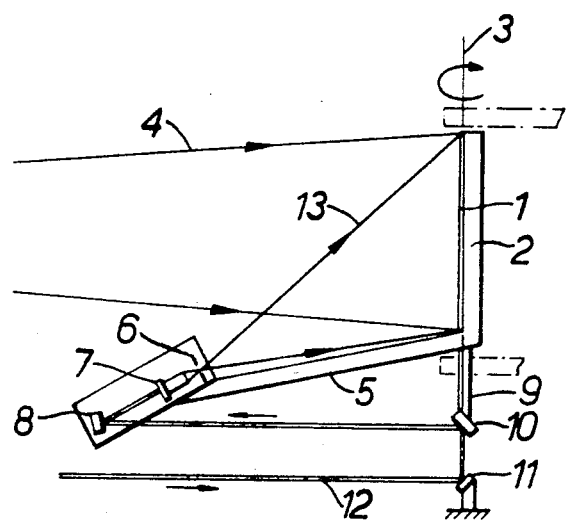

SYNTHETIC 3-D HOLOGRAM WITH REDUCED DISPERSION UPON RECONSTRUCTION

CROSS-REFERENCE TO RELATED APPLICATION

This Application discloses an improvement in the method and apparatus of copending application, Ser. No. 770,664, filed 25 Oct. 1968, by J D Redman and W P Wolton, now U.S. Pat. No. 3,598,484.

BACKGROUND OF THE INVENTION

This invention relates to holography and is an improvement in or modification of the invention described and claimed in our British Pat. specification No. 1,218,556 (U.S. application, Ser. No. 770,664 filed 25 Oct. 1968).

In the above specification there is disclosed a holographic method of producing a three-dimensional reconstruction of a scene comprising producing a plurality of representations, eg positive photographic transparencies, of the scene at a corresponding plurality of viewing angles relative to the scene, e.g., by moving a camera in an arc about a point in the scene, making holograms from the representations on a common photosensitive plate, each hologram being made using a non-diffused object beam directed on to the plate at an angle corresponding to the viewing angle of the representation from which is made and a reference beam directed at a constant angle on to the plate for all the holograms, and forming a reconstruction of the holograms using a reference beam directed at the same constant angle on to the plate.

In the disclosed embodiment of the method, the plate is rotated through the appropriate angle, about an axis, between each hologram-forming exposure, and the reference beam is directed obliquely on to the plate in a plane which is normal to the axis of rotation.

This arrangement introduces some mechanical complexity, since the reference beam must rotate with the plate to keep its angle of incidence constant. As the reference beam is usually reflected on to the plate from a mirror, the latter must thus be arranged to rotate through half the angle of the plate. Moreover when viewing the reconstruction of the representations of the scene, dispersion of the mercury reconstructing beam by the hologram confuses the successive images as the eye moves round unless an optical filter is used (with resulting reduction in light intensity).

SUMMARY OF THE INVENTION

According to the present invention the mean direction of the reference beam is directed obliquely on to the plate substantially in a plane which is normal to the plate and which includes the axis of rotation. The beam may be derived via a mirror located on, and rotatable with, said axis. Where a divergent reference beam is used, as preferred, the mean direction is the axis of the beam.

DESCRIPTION OF THE DRAWING

To enable the nature of the present invention to be more readily understood, attention is directed, by way of example, to the accompanying drawing, which is a simplified elevation of the relevant portion of apparatus for producing the holograms.

DESCRIPTION OF PREFERRED EMBODIMENT

In this drawing a hologram plate 1 is mounted on a holder 2 rotatable about an axis 3. A divergent object beam 4 from the transparency (not shown) constituting each view of the scene is directed on to plate 1. The angular position of plate 1 about axis 3, ie relative to beam 4, is made to correspond, for each exposure, with the angle at which the corresponding transparency was taken, as described in the aforementioned specification.

At the end of an arm 5 extending from holder 2 and rotatable therewith, is mounted a pinhole 6, an objective lens 7 and a mirror 8. On an axial extension 9 of holder 2 is mounted a mirror 10 which rotates with the holder. Below mirror 10 is a fixed mirror 11. A laser beam 12 is reflected from mirror 11 to mirror 10, thence to mirror 8, and thereafter is formed by lens 7 and pinhole 6 into a divergent reference beam 13. The axis of beam 13 lies in a plane normal to plate 1 and which includes the axis of rotation 3. Thus as the holder 2 is rotated, the angle of incidence of beam 13 on plate 1 remains unchanged.

When subsequently viewing the hologram, the laser beam 12 is preferably replaced by light from a mercury lamp, and the reconstructing beam, which replaces beam 13, is preferably parallel rather than divergent, as explained in the aforementioned specification. It is found that on viewing the hologram as therein described, ie with the eye located to the right hand side of holder 2 and moved in a direction normal to the plane of the drawing, the above-mentioned dispersion effect is greatly reduced.

In the above-described example the axis 3 lies in the plane of plate 1. Although this is the simplest way of embodying the present invention, it is not essential. For example, the plate can be displaced from the axis on the side thereof opposite to lens 7.

To reduce any adverse effects due to small movements, eg vibration, of the arm 5, damping means may be applied thereto. For example frictional damping can be provided by means of a member (not shown) connected adjacent to its outer end and arranged to make rubbing contact with a surface as the arm rotates. Instead of using an arm, the optical elements 6, 7 and 8 can be mounted on an arcuate track (not shown) around which they are driven in register with the rotation of the holder 2, eg by a worm gear engaging a toothed track.

I claim:

1. A holographic method of producing a three-dimensional reconstruction of a scene comprising producing a plurality of representations of the scene at a corresponding plurality of viewing angles relative to the scene, said plurality of representations being produced at a plurality of locations at a substantially constant distance from a selected point in said scene, and said point occupying the same position in the field of view in each representation, making holograms from said representations on a common photo-sensitive sheet, each said hologram being made using a non-diffused object beam directed on to said sheet at an angle corresponding to the viewing angle of the representation from which is made and a reference beam directed at a constant angle on to said sheet for all said holograms, and forming a reconstruction of said holograms using a reference beam directed at said constant angle on to said sheet, the direction of said object beam being fixed and the photo-sensitive sheet being rotated about an axis to provide each said corresponding angle between said beam and sheet, the mean direction of the reference beam when making each hologram being oblique to the common photo-sensitive sheet substantially in a plane which is normal to said sheet and which includes the axis of rotation of said sheet.

2. Apparatus for producing a translucent sheet having recorded thereon a plurality of holograms produced from a corresponding plurality of representations of a scene at a corresponding plurality of viewing angles relative to the scene, each said hologram being made using a non-diffused object beam directed on to said sheet at an angle corresponding to the viewing angle of the representation from which is made and a reference beam directed at a constant angle on to said sheet for all said holograms, said apparatus comprising means for mounting a plurality of transparencies successively in a non-diffused coherent light beam, a rotatable holder for a photo-sensitive sheet, means for projecting an object beam comprising the image on each transparency on the sheet held on said rotatable holder, and means for simultaneously projecting a coherent reference beam obliquely on to the sheet, said reference beam projecting means being so linked to said rotatable holder that as the holder is rotated the angle which the mean direction of the reference beam makes with the sheet remains constant and is substantially in a plane which is normal to the sheet and includes the axis of rotation of the holder.

3. Apparatus as claimed in claim 2 wherein said reference beam projecting means comprises a first mirror located on and rotatable with said axis and arranged to receive light from a source, a second mirror located at a fixed radius from said axis and arranged to rotate about said axis in register with said holder, said second mirror being aligned to receive light from said first mirror and to reflect it towards said sheet.

4. Apparatus as claimed in claim 3 comprising a third mirror fixedly located on said axis and aligned to receive light from said source and to reflect it axially on to said first mirror.

5. Apparatus as claimed in claim 3 comprising optical means associated with said second mirror, and rotatable therewith about said axis, for diverging the light reflected from said second mirror and thereby projecting a divergent reference beam.

6. Apparatus as claimed in claim 3 wherein said second mirror is mounted on an arm rotatable about said axis.

7. Apparatus as claimed in claim 2 wherein said reference beam projecting means comprises means for directing a light beam colinearly with said axis, a first mirror located on and rotatable with said axis and arranged to receive said light beam, and a second mirror located at a fixed radius from said axis and arranged to rotate about said axis in register with said holder, said second mirror being aligned to receive light from said first mirror and to reflect it towards said sheet.

* * * * *